Dec. 1, 1959 F. H. WHITHAM 2,914,996

ELECTROSTATIC UNIT FOR PRODUCING PRINTED CIRCUITS

Filed June 3, 1953 2 Sheets-Sheet 1

INVENTOR.
FREDERICK H. WHITHAM

Dec. 1, 1959

F. H. WHITHAM 2,914,996

ELECTROSTATIC UNIT FOR PRODUCING PRINTED CIRCUITS

Filed June 3, 1953

2 Sheets-Sheet 2

INVENTOR
FREDERICK H. WHITHAM

United States Patent Office 2,914,996

Patented Dec. 1, 1959

2,914,996

ELECTROSTATIC UNIT FOR PRODUCING PRINTED CIRCUITS

Frederick H. Whitham, North Adams, Mass., assignor to Sprague Electric Company, North Adams, Mass., a corporation of Massachusetts Application June 3, 1953, Serial No. 359,411

1 Claim. (Cl. 95—1.7)

Figure 1:
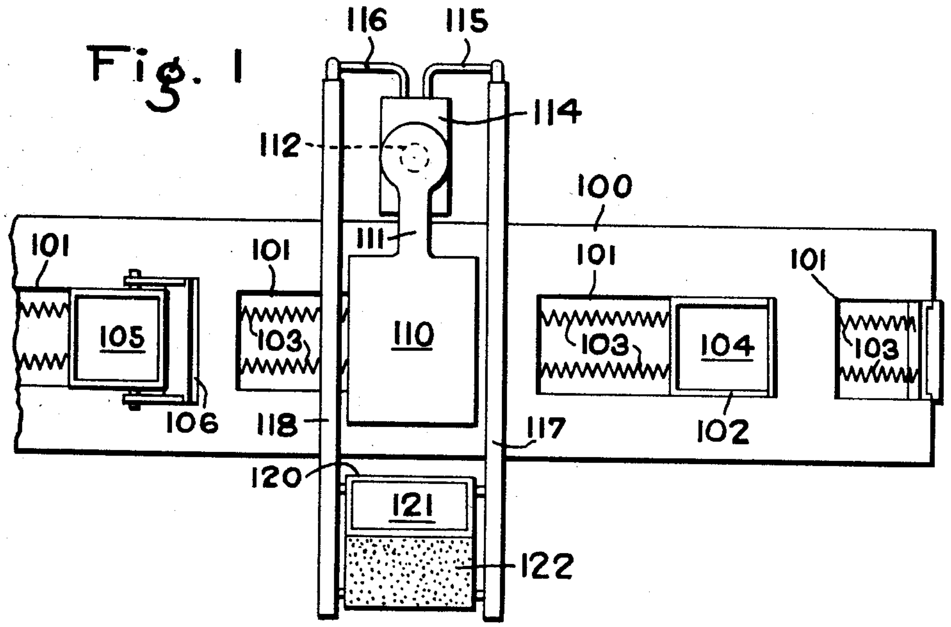

This invention relates to the printing of electrical conductive circuits on an insulatory base member. More particularly, the invention relates to a novel method and apparatus for applying conductive printing inks to miniature ceramic discs or plates.

It has long been a problem in the printed circuit art to provide a simplified system for applying complicated electrical networks to miniature bases. It will be readily appreciated that even minor deviations in the width, as well as changes in the thickness of the printed lines, cannot be tolerated, since the printed networks readily reflect such inconsistencies in undesired changes in the current-voltage values of the network. In order to overcome this difficulty, it has been customary to employ expensive silk screening processes requiring many manual operations and extremely costly handling techniques. Recently a system of printing has been developed known as the Xerographic system in which a printing plate is electrostatically charged and then selectively discharged to leave a predetermined, oriented surface charge, and subsequently contact it with an oppositely charged printing ink which adheres to the charged pattern on the plate, whereby the ink may be transferred to paper, cloth, and the like material in duplication of the oriented pattern. Detailed examples of such type printing procedure will be found in U.S. Letters Patent No. 2,357,809 and 2,297,691.

It is presently proposed to make use of this novel printing process in such manner as to render it particularly suitable for printing conductive and/or resistance inks on ceramic plates or discs. One particular advantage of applying a Xerographic printing process to the printed circuit art is the elimination of the necessity for cutting different silk screens every time it is desired to change the conductive and/or resistance pattern of a network. With the Xerographic process it is possible to replace one printed circuit with a second printed circuit by the simple expedient of exchanging transparent sheets bearing inked drawings of the same. It will be apparent to those skilled in the art that this eliminates the great loss of time previously found necessary to change over to a different circuit design. Another advantage resides in the fact that the template sheets used with the Xerographic process may be printed in large, clear type with precise configurations and reduced optically to provide miniature networks of extreme clarity and accurateness.

The present invention may be broadly described as comprising an assembled apparatus having an article loading section, an article transferring section, and a printing section, all of which are particularly adapted for use in a continuous manufacturing process in which the article may follow a single continuous uninterrupted path from the initial formative step to the finished product. Specifically, the present invention contemplates utilizing an endless type conveyor which may be provided with a plurality of article receiving cavities for carrying the articles along a straight line path between an article loading mechanism and a discharge structure, and between which may be interposed a printing apparatus of the type previously described.

In another form, the invention comprises a pair of rotating, mating, wheel-like drums, one of which functions as an article carrier, and the other of which functions as a rotary printing mechanism.

Figure 2:
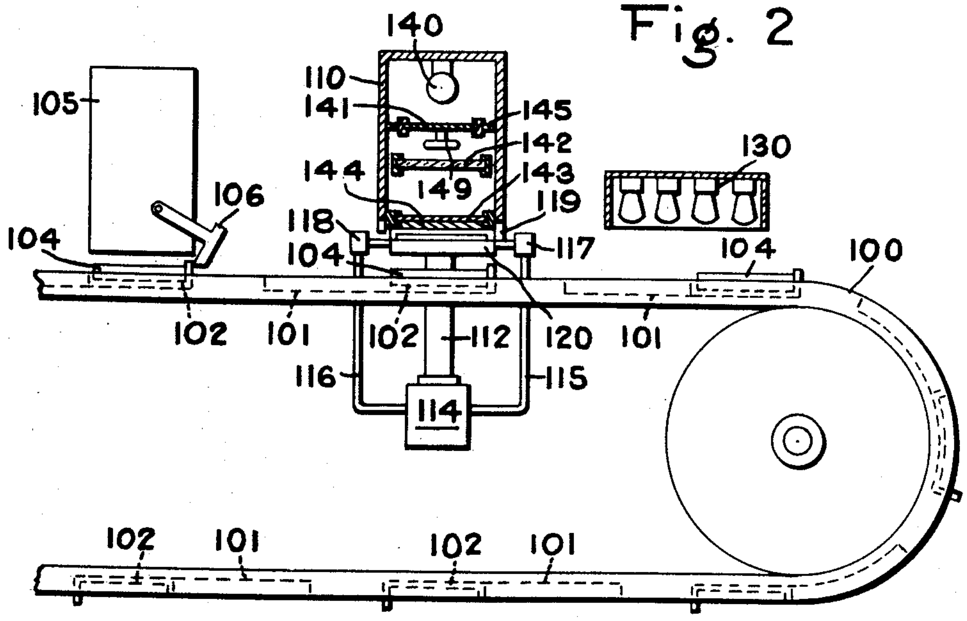
Figure 2A:
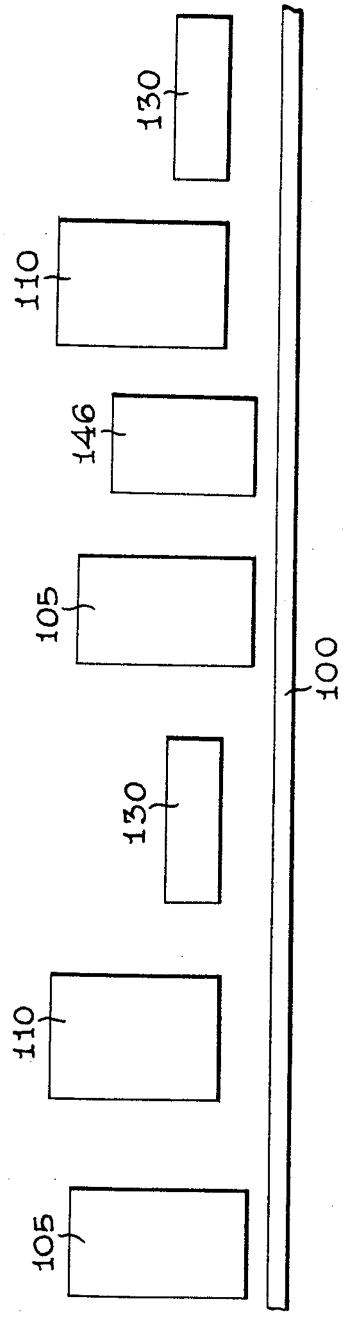
Figure 2B:
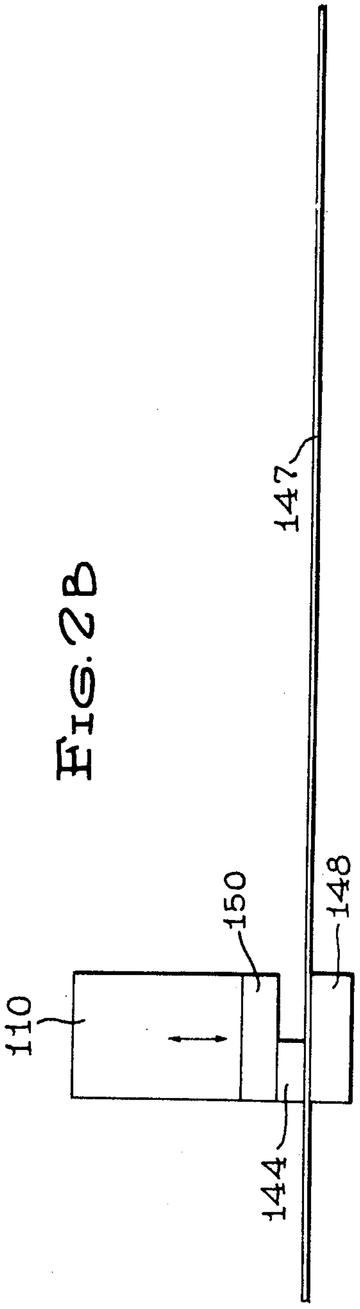

Having broadly described the invention, reference will now be made to the drawings which illustrate specific examples of the same and in which:

Fig. 1 is a top plan view illustrating diagrammatically the loading, transferring, and printing mechanism of a preferred form of invention, Fig. 2 is a diagrammatic side elevational view of the form of the structure shown in Fig. 1, Fig. 2A is a schematic illustration of a plurality of printing stations, and Fig. 2B is a schematic illustration of apparatus for printing on a continuous sheet.

As shown in Fig. 1, the present arrangement provides an apparatus for automatically printing conductive or resistance films on ceramic plates in an uninterrupted manner. This apparatus comprises an endless type belt conveyor 100 in which is formed a plurality of spaced rectangular recesses 101. Each recess 101 is provided with an article receptacle 102 mounted for reciprocation within recess 101 and normally resiliently urged toward the forward end of the recess by means of a pair of springs 103. The receptacles are mounted to slide longitudinally of the conveyor belt during movement of the same for a purpose hereinafter apparent and are adapted to receive the ceramic plate members 104 from an article loading apparatus 105, positioned vertically above the conveyor belt and overlying the path of movement of recesses 101.

The article loading mechanism is formed as a tubular chamber in which the ceramic plates may be vertically stacked in precise alignment for selective discharge out of the open bottom into the receptacle members 102 as they pass beneath the storage chute. In order to prevent the discharge of more than a single ceramic plate simultaneously, a blocking arm 106 is pivoted to the walls of the chute and disposed to one side of the front face thereof directly in the path of the article receptacles 102. With this arrangement the leading edge of the article receptacle will contact the depending edge of blocking arm 106 to pivot the same upwardly so that the receptacle may pass thereunder. This movement of arm 106 is availed of to release, by means of suitable detent means, not presently illustrated, a single ceramic plate from within storage chute 105 whereby the plate drops directly into the article receptacle. As the loaded receptacle 102 passes beneath arm 106, the lower edge of the arm bears upon the surface of the plate to prevent accidental passage of two such plates in a single receptacle. If desired, the lower edge of arm 106 may be provided with a suitable brush-like surface, or alternatively, with a rotary brush element for cleaning the exposed surface of the ceramic plate as it proceeds away from the storage chamber.

After the reception of a ceramic plate in receptacle 102, the belt continues to move toward the printing station; in the instant case, a reciprocable chamber 110 positioned vertically above the conveyor in alignment with the path of movement of the conveyor recesses 101. The operation of the printing mechanism will be obvious from an inspection of the drawings and consists simply in lowering chamber 110 to the surface of the conveyor in synchronism with movement of the ceramic plate 104 into registry beneath the printer. By this type arrangement it is possible to transfer a desired inked pattern to the exposed surface of a ceramic plate in a simple operation, the printing mechanism being provided for this purpose with a printing plate 144 extending beneath the lower boundary of chamber 110. Upon completion of a printing operation the printing mechanism 110 is withdrawn upwardly from contact with the ceramic plate to an upper limit position spaced from the conveyer surface.

As indicated previously, the printing mechanism most advantageously used in the present arrangement comprises a Xerographic system in which the printing ink is maintained in the desired pattern through electrostatic forces. The details of this Xerographic printing mechanism will be more apparent from reference to Fig. 2 of the drawings, and particularly the structure illustrated within housing 110. As shown, the Xerographic mechanism comprises an illumination lamp 140, a template 141 or other transparent medium, as for example, glass or onionskin paper, a lens 142, and a printing plate 143, 144. The printing plate comprises a transparent backing or supporting surface 143 to which is permanently bonded by any suitable means, a thin photoconductive film of selenium 144. The arrangement is such that template 141, lens 142 and printing plate 143, 144 are positioned in spaced alignment in relation to lamp 140 and is such that the light rays emanating from lamp 140 pass through the clear or transparent portions of template 141 through the focus lens 142 to the printing plate 143, 144, to illuminate selected portions of the printing plate, i.e., in those areas in which light has not been blocked by printed indicia on the template 141.

It is thus possible to selectively dissipate an initial electrostatic charge carried on the entire surface of semi-conductive film 144 by energizing selected portions of the film to become electrically conductive by virtue of incident light, and to thus drain off part of the electrostatic charge leaving a residual charge in a patterned replica of the printed indicia on template 141. A suitable printing ink is then applied to the surface of the semi-conductive film 144 and adheres to it in only those parts where the charge remains.

According to the present invention, the electrostatic charging and application of printing ink to the exposed surface of the semi-conductive printing plate is obtained by means of a reciprocating carriage member 120 mounted in parallel guideways 117 and 118, which traverse the width of main conveyor 100. Carriage 120 is provided with a high voltage electrode 121 and an inking pad 122, and is adapted to move laterally across the conveyor surface and directly beneath the printing mechanism when the latter is in its raised position, to bring electrode 121 and then printing pad 122 into registry with printing plate 143, 144 depending outside housing 110. By this arrangement it is possible to sequentially charge the surface of the printing plate and then re-ink it each time housing 110 is in its upper limit position immediately after completion of a printing operation on one ceramic plate and prior to a second printing operation on a sequential plate. It will be obvious that the charge applied to the plate surface 144 will be immediately and continuously drained off, except for the patterned replica of the printed matter on template 141, due to the conductive state of the illuminated areas of the plates so that the ink subsequently applied by pad 122 will not adhere to any portion of plate 144 except in the desired pattern. Return of the carriage to its starting position is substantially instantaneous.

In some instances it will be desirable to provide interlocked or interconnected control networks for selectively energizing electrode 121, and lamp 140 so as to avoid wasteful expenditure of energy. This may be easily implemented by providing a limit switch in the path of movement of carriage 120 in order that electrode 121 and lamp 140 will not be energized until the carriage begins passing under housing 110. It may also be desirable to provide a de-inking pad or brush on carriage 120 ahead of electrode 121 for cleansing plate 144 of any remaining ink from a previous operation. This pad or brush may be made automatically retractable on the return stroke of the carriage so as not to remove any fresh ink applied on the forward stroke.

A suitable synchronizing control mechanism, as for example, an electric, pneumatic or hydraulic motor 114 may be provided to move the printing mechanism 110 and carriage 120 in the desired sequence, the motor being connected via a vertical shaft 112 to an integral extension 111 of housing 110 and via conduits 115 and 116 with the guideways 117 and 118 of the conveyor mechanism 120. In cases where the motive mechanism is hydraulic or pneumatic, shaft 112 may comprise the operating arm of a piston housed within the motor chamber 114, while conduits 115 and 116 may comprise passageways for the transfer of the hydraulic or pneumatic motive fluid to guideways 117 and 118, which guideways may then serve as a servo motor unit for actuating the movement of carriage 120 into and out of registry with the printing mechanism 110 when in its upper limit position.

As will be apparent from an inspection of Fig. 2, the housing 110 includes an extended lower edge 119 which extends below the normal terminal boundary of the housing for a short distance. This leading edge is availed of to register, upon reciprocation of housing 110 toward contact with conveyor belt 100, in front of the leading face of an article receptacle 102 to block further forward movement of the article receptacle as the conveyor continues to move. Preferably the leading edge 119 of housing 110 and at least a portion of article receptacle 102 constitute conductive contact members forming a normally open switch in the control circuit of the motive means 114 whereby the downward movement of the printing unit 110 may be initiated in distinct steps to bring edge 119 into a first position which is adjacent to but slightly spaced from the surface of conveyor 100 so that as an article receptacle and supported ceramic plate moves under the printing mechanism, the leading edge of the receptacle 102 contacting housing edge 119 to positively stop the receptacle. The contacting of the housing and receptacle edges then completes an energizing circuit for a second step in further lowering housing 110 toward the conveyor to bring printing plate 144 with its oriented inked surface into contact with the ceramic plate 104. During this period conveyor 100 continues to move, a lost motion action being provided between article receptacle 102 and the conveyor belt by virtue of the resilient spring members 103. Springs 103 also serve to insure an accurate and precise registering of an article receptacle, with its supported ceramic plate, beneath the printing plate 144. The contact periods, as well as the impression force, may be regulated as desired by any suitable control means incorporated in the control circuit of motor 114, and if desired, may be regulated by a timing mechanism under the supervisory control of the switch 102, 119.

After completion of the printing operation, housing 110 is automatically raised and the printed plate is permitted to proceed forwardly with the conveyor belt. Preferably a suitable drying means, as for example, a battery of infrared lamps 130, may be provided in alignment with the printing mechanism 110 whereby the surface ink on the ceramic plate may be immediately dried before the completed unit is discharged from the conveyor.

It will be apparent that the present arrangement is particularly suited for the execution of multiple printing operations in sequence, as for example, the application of alternate conductive and resistance circuit components to a single ceramic plate. In such case a plurality of printing mechanisms 110 and drying ovens 130 may be provided in series along the path of movement of the conveyor belt. In such multiple type operations it may also be desirable to provide suitable lacquering or other insulation applying stations at appropriate intervals between different printing stations whereby individual component circuit networks may be insulated and isolated, one from another, on a single dielectric backing plate, any desirable interconnection between the isolated networks being provided by edge connections applied in a well-known manner at a subsequent printing station.

Alternatively, it is also possible, where a more positive insulation medium is found to be mandatory between different circuit components in a total network, to provide a series of ceramic plate dispensers 105 in alignment at proper intervals along the conveyor path, the subsequent dispensers being so oriented as to deposit a second ceramic plate into accurate registery with a previously printed ceramic plate. A conventional cohesive bonding of the plates may be had by application of any of the many well-known organic or inorganic adhesives, as for example, by a spraying station 146. Thereafter additional circuit components may be printed on the second ceramic plate, and so on as desired.

It will further be apparent that one of the main features of the present printed circuit manufacturing system is the ready facility and ease with which changes may be made in the networks being applied to the ceramic plates. Thus at any instance in the continuous printing operation, one transparent circuit template 141 may be removed by knob 149 from the housing 110 by a simple manual withdrawal of the same from the support bracket 145, and a second transparent template with a different circuit design be substituted therefor in a matter of seconds. It will be apparent that this permits a change in design without the loss of even one ceramic plate.

From the above arrangement it will be readily understood that the printing of miniature circuit components has been greatly simplified. It will further be appreciated that the present invention provides a distinct improvement over the present forms of Xerographic printing systems, and those commercial embodiments in which it is necessary to manually transfer the plate from a copying mechanism to a camera mechanism, and then back to the copying mechanism, and subsequently to a drying or fusing mechanism. With the present arrangement substantially all of the operations are completed in a continuous automatic manner.

The printing ink used in the present invention may be formed in the manner indicated in said prior Patents Nos. 2,297,691, and 2,357,809, or if desired, as set forth in Patent No. 2,618,551. Alternatively, the printing ink may comprise a metal powder or dust, as for example, of silver, gold, platinum, iron or carbon, all of which may be attracted to an electrostatically charged base. Further, the invention is not necessarily limited to operations upon ceramic dielectric plates or discs but may be used to apply printed circuitry to organic plastic films and other flexible materials, as for example, Mylar (linear condensation product of terephthalic acid and ethylene glycol), Teflon (tetrafluoroethylene), polystyrene, glass cloth, etc.

It will be obvious, if desired, that the printing procedure of the present invention may be used to apply conductive and/or resistance networks to a continuous strip 147 of insulating material, as for example, Mylar, polytetrafluoroethylene, etc., by the simple innovation of orienting the continuous strip 147 to pass directly between a reciprocating Xerographic printing assembly, such as 110 of Fig. 1, and to sequentially reciprocate the said assembly to apply printed indicia to the strip 147 in the manner of a stamping operation. In such type of embodiment, the continuous insulation strip 147 may be guided in proximity with the printing assembly over a stationary anvil 148 serving as a reaction member reinforcing the strip 147 when contacted by the ink-bearing printing plate 144. Further, it will be appreciated that should the speed of the insulation strip 147, for one reason or another, be at a relatively high rate, it is also possible to permit the printing plate 144 to have a lost motion connection 150 with the printing assembly 110, by any conventional and well-known means, whereby the plate may travel in aligned parallel relationship with the strip 147 for an instantaneous period sufficient to effect a complete and unblurred inked imprint, the lost motion connection returning the plate to its original position of rest in time for a sequential operation at a spaced point on the continuous strip.

One of the main advantages accruing to printed networks employing a directly deposited conductive material, such as silver dust, resides in the obtaining of an extremely close adherence to computable theoretical values, thus permitting more accurate control over the circuit parameters. It will be obvious that the elimination of solvents and the like, which have been found necessary with conventional printing procedures, reduces any substantial charge in the fused circuit medium as compared with the same quantity of medium before fusion. This innovation permits precise control over the processing of commercial quantities in a manner heretofore unknown.

As many apparently widely different embodiments of this invention may be made without departing from the spirfit and scope hereof, it is to be understood that the above invention is not limited, except as defined in the appended claim.

What is claimed is:

An apparatus for producing printed circuit units in rapid sequence by applying conductive inks to the surface of successive insulating members comprising in combination a continuously movable endless conveyor means, support means carried by said conveyor means for supporting insulating members in spaced alignment, means loading insulating members on said support means, a printing mechanism mounted vertically above said endless conveyor structure including an electrostatically chargeable printing plate, means for producing an electrostatic latent image on said plate, support means for said plate vertically reciprocable with respect to said supported insulating members, a reciprocable carrying member mounted transverse to said conveyor, a high voltage electrode on said transversely reciprocable carrying member, an inking pad on said transversely reciprocable carriage for transferring said image to said insulating members, means for moving said electrode and pad laterally to said conveyor surface and into engagement with said printing plate whereby said printing plate is repetitively sequentially inkable and chargeable, means connected to said printing mechanism cooperable with portions of said endless conveyor to engage said printing plate against said insulating members for transferring said image to said insulating member, and means holding the insulating members in fixed relation to the printing plate during continuous motion of said conveyor and means returning said carriage and said printing plate from said engagement with said insulating members.

References Cited in the file of this patent

UNITED STATES PATENTS

| | | |
|---|---|---|
| 680,687 | Blood | Aug. 20, 1901 |
| 2,221,776 | Carlson | Nov. 19, 1940 |
| 2,297,691 | Carlson | Oct. 6, 1942 |
| 2,357,809 | Carlson | Sept. 12, 1944 |
| 2,551,582 | Carlson | May 8, 1951 |
| 2,612,106 | Ryckman | Sept. 30, 1952 |
| 2,624,652 | Carlson | Jan. 6, 1953 |
| 2,701,764 | Carlson | Feb. 8, 1955 |